Patented Jan. 3, 1928.

1,655,184

UNITED STATES PATENT OFFICE.

OTTO HAHN, OF BERLIN, GERMANY, ASSIGNOR TO UNITED STATES RADIUM CORPORATION, OF NEW YORK, N. Y., A CORPORATION OF DELAWARE.

RADIUM PREPARATION AND PROCESS OF MAKING SAME.

No Drawing. Application filed July 29, 1925, Serial No. 46,891, and in Germany August 15, 1924.

This invention relates to radio-active preparations has to do more particularly with such preparations which, in the solid state, are what is termed "free emanating", that is, in the case of radium, for example, liberate their emanation or radon freely. The invention includes not only radio-active substances capable of producing the desired result, but also the method by which such substances are obtained.

Radon from radio-active substances is now widely used for medical and other purposes, and for certain of these uses, the radon should be as concentrated as possible. It is well-known that the emanating power of such substances is a variable which is much affected by surrounding conditions such as moisture, heat, and solution, and though it has been proved experimentally that the rate of production of radon in a solid compound is substantially the same as in the solution, still it is found that very little radon escapes from the solid. This has been explained on the theory that the major portion of the radon is occluded in the solid but in any event, the free-emanating power in the dry solid state produces available radon in much less amount than may be secured from the solution. To secure radon from radium in solution, so-called pumping off processes are employed, which involve the use of expensive equipment, and the production of radon in a concentrated form cannot be carried on in a simple manner by the processes now employed. Also, up to the present, solid compounds which give off a considerable percentage of their radon at ordinary temperatures over long periods of time, have been unknown.

I have discovered that solid radium preparations which give off large quantities of radon freely may be prepared by producing such substances in a sufficiently fine state of subdivision, and I have worked out simple methods for obtaining the desired result by chemical and physical treatment.

The purpose of any of the methods of treatment used is to produce a preparation including radium, for example, in which the particles of the radium salt are maintained in finely divided and widely dispersed condition. To secure the radium in such condition, the radium salt is treated in conjunction with another material which is capable of being produced in a form having large internal and external surfaces per unit volume, over which surfaces a thin film of the radium salt is distributed. The methods involve the separation of the radium salts or compounds in a state of fine division on micro-crystalline precipitates, or on colloidal substances which permanently retain not only their outer visible surface, but also their inner structure. The salts of various earths, thorium, and the like, are suitable for treatment with the radium compounds, and in the same way, hydroxides can be used, as, for example, those of aluminum, iron, the rare earths, etc., which are precipitated from the radium-containing solution by means of ammonia or alkalies. For the quantitative precipitation of the radium, the ammonia or alkali must contain those ammoniacal or alkaline salts with which radium forms precipitates which are soluble only with difficulty. Ammonium sulphate, alkaline chromates and other similar salts are examples of these substances.

If a radium salt, for instance, is mixed with a soluble lanthanum salt and the mixture is precipitated by hydrofluoric acid under suitable conditions, there is thrown down an amorphous or nearly amorphous precipitate of lanthanum-fluoride, in which radium-fluoride is dispersed in a finely divided state. It has been found that such a mixture liberates radon in large amounts and that the percentage of the radon escaping is practically constant. In place of lanthanum salts, various other compounds can be used which have the property, when treated with suitable precipitants, of forming finely divided precipitates which exist for long periods in that form. Salts of various earths or of thorium are suitable for the purpose, and various acids, other than hydrofluoric, which act in the same way as hydrofluoric acid, may be used.

If desired, it is possible to use hydroxids as a vehicle for carrying the radium instead of relatively insoluble salts. Such hydroxids having a large surface, carry the precipitated radium compound in a state of very fine division, and also prevent the radium salt from combining so as to form crystals of perceptible size. In the same way it is also possible to make use, as vehicles, of compounds which, upon being heated at ordinary pressure, or in a vacuum, assume a voluminous or finely divided state. Among such compounds may be mentioned certain salts of thorium, of alkaline earth metals, of metals of the iron-nickel group, and of magnesium, although there are numerous others which serve the desired purpose. The radium compound is preferably precipitated out of solution with the salts in question, or is otherwise brought into thorough mixture with them. Then the temperature is raised to the degree required to obtain the finely divided condition.

In each case the methods above described serve the same purpose and give the same result. They provide a solid substance which liberates large quantities of radon, while in a dry state.

As an example of the first of the above methods, a solution of one m. g. of radium bromide is mixed with a solution of 25 m. g. lanthanum nitrate. The mixture is diluted to 30 c. c., and then poured into a paraffined glass or into a platinum cup. Pure 10% hydrofluoric acid is now added to the solution at ordinary temperatures, drop by drop, until precipitation is complete; that is until the addition of another drop of the acid no longer produces further precipitation. The radium fluoride has now been quantitatively precipitated with the lanthanum fluoride and after the mixture has been allowed to stand for a short time, it is filtered off through a paraffined funnel and washed until the filtrate gives a neutral reaction. The precipitate is then left to dry at ordinary temperatures, and is then ready for use.

An example of the method involving the use of hydroxids is as follows: A solution of .05 m. g. radium bromide is added to a solution of 100 m. g. of chloride of lime, and the solution is then treated at ordinary temperatures with ammonia containing a 2% solution of ammonium sulphate, until the precipitation is complete. The precipitate is then filtered off, thoroughly washed, dried at ordinary temperatures, and is then ready for use.

As an example of the third method above mentioned, 0.1 m. g. of radium bromide is dissolved in water, with 50 m. g. of thorium nitrate, then evaporated to dryness on a water bath. The dried substance is then heated in an electric furnace, for two hours at from 500 to 550° C., care being taken that the temperature does not exceed the upper limit even for a short time. By this treatment the thorium salt with which the radium salt is mingled, is converted into an exceedingly finely divided oxide from which radon is freely liberated. It is advisable to store the product produced by this and the preceding methods in a dry room from which carbonic acid is excluded.

It will be seen that by each of the methods above described, there is produced a radium preparation which consists of a carrier through which a radium salt is distributed and disseminated in a finely divided state. The carrier is a substance which permanently retains not only its outer visible surface, but also its internal structure, which likewise has a large surface. Throughout these surfaces the finely divided radium salt is distributed, and by reason of the permanence of the carrier as to form, this distribution exists without change for indefinite periods.

In accordance with the methods described, I have succeeded in producing such radium preparations which liberated 98 to 99% of their radon at ordinary temperature without evacuation or other manipulation. Although these preparations have been examined and studied during a period of many months, it is found that although there was a certain decrease in the emanating power observable throughout such periods, this decrease was very slight. One particular specimen examined emanated 98% as soon as prepared, and after 11 months, the emanating power had fallen to 95.5%. Another preparation made under better conditions emanated 99% when made, and had fallen only to 97.6% after a period of 7 months. In each case the preparation showed a strong activity. Experiments with preparations of radio-thorium continued for a longer period of time, indicated that this slight decrease in emanating power disappeared in the course of time.

These new compositions are capable of retreatment in a manner similar to those previously described, and their free-emanating property may thus be restored. Such treatment, if necessary, is of course much simpler than the working over of insoluble radium salts deposited in solutions of radium in the course of time.

It is apparent from the foregoing that these solid preparations of radium prepared by the methods which I have described can be used for the obtaining of radon in a much simpler and more quantitative manner than has been possible according to the methods heretofore employed and involving the use of solutions of radium salts. The new substances may, therefore, be handled with greater facility, and are consequently of much greater utility for medical and other purposes.

I claim:

1. A radium preparation comprising a radium salt and an oxide of a metal of the iron-nickel group, the radium salt being in a finely divided condition and distributed throughout the said oxide.

2. A radium preparation having the property of freely liberating radon, which comprises a radium salt and an inert material through which the radium salt is dispersed, the inert material having large surfaces per unit of volume on which surfaces the radium salt is distributed in widely dispersed condition with the particles of the salt in a state of extremely fine subdivision.

3. A radium preparation having the property of freely liberating radon, which comprises a mass composed of particles of a carrier in a state of extremely fine subdivision and radium salt in the form of particles widely dispersed throughout the carrier, the particles of the radium salt being of extremely minute size.

4. A process of producing radium preparations which comprises mixing a solution of a radium salt with a solution of a salt of another element, and treating the mixture to secure the said salts, in thorough intermixture and in a state of fine subdivision, from the solution.

5. A process of producing radium preparations which comprises mixing a solution of a radium salt with a solution of a salt of another element, separating a radium salt from the mixture in a finely divided state, and simultaneously separating a salt of the other element from the mixture in the form of a solid made up of particles in a state of extremely fine subdivision, the salt retaining this form.

6. A process of producing radium preparations which comprises mixing a solution of a radium salt and a solution of a salt of another element, and treating the mixture with a precipitant, which produces a finely divided precipitate containing radium, and an amorphous precipitate containing the other element which has large surfaces permanently retained over which the radium salt is distributed.

7. A process of producing radium preparations which comprises mixing a solution of a radium salt with a solution of a salt of another element, which forms difficultly soluble hydroxide having a large surface, and treating the mixture with a precipitant having a basic reaction to which has been added small quantities of alkaline salts, which, when added to radium salts, form radium containing compounds soluble with difficulty.

8. A process of producing radium preparations which comprises mixing a solution of a radium salt with a solution of a salt of another element, which latter salt permanently assumes a form having a large surface upon heating, evaporating the mixture of the solutions to dryness and then subjecting the dried substances to heat to cause the salt of the said element to assume a form in which it has large surfaces over which the radium salts are distributed.

In testimony whereof I affix my signature.

OTTO HAHN.